United States Patent [19]

Green et al.

[11] 4,379,596
[45] Apr. 12, 1983

[54] SUPERPOSITIONED VEHICLE WHEEL BALANCE WEIGHTS AND METHOD

[75] Inventors: Bernard J. Green, Bristol, Tenn.; Jerome J. Chorosevic, Bristol, Va.

[73] Assignee: Speed Clip Manufacturing Corp., Bristol, Tenn.

[21] Appl. No.: 75,665

[22] Filed: Sep. 14, 1979

[51] Int. Cl.³ .......................... B60B 13/00
[52] U.S. Cl. .................................. 301/5 B
[58] Field of Search .......... 301/5 B, 6 WB; 74/573 R; 51/169; 241/292; 295/6; 152/330 R, 236, 237

[56] References Cited

U.S. PATENT DOCUMENTS

| | | | |
|---|---|---|---|
| 1,667,344 | 4/1928 | Couture | 301/5 B |
| 1,692,145 | 11/1928 | Woolson | 301/5 B |
| 2,029,561 | 2/1936 | DuSang | 301/5 B |
| 2,311,999 | 2/1943 | Purvis | 301/5 B |
| 2,957,366 | 10/1960 | Driver et al. | 301/5 B X |
| 2,993,386 | 7/1961 | McClendon | 301/5 B X |
| 3,002,388 | 10/1961 | Baleman | 301/5 B X |
| 3,669,500 | 6/1972 | Ende | 301/5 B |
| 4,068,898 | 1/1978 | Hanson | 301/5 B |

FOREIGN PATENT DOCUMENTS

| | | | |
|---|---|---|---|
| 597134 | 5/1960 | Canada | 301/5 B |
| 774793 | 12/1934 | France | 301/5 B |
| 534981 | 10/1955 | Italy | 301/5 B |
| 911275 | 11/1962 | United Kingdom | 301/5 B |

Primary Examiner—Charles A. Marmor
Attorney, Agent, or Firm—Lalos, Leeds, Keegan, Lett & Marsh

[57] ABSTRACT

A balance weight for counterbalancing vehicle wheels having a rim flange and a protruding lip to receive the weight composed of a body having a mass of heavy metal and a clip or adhesive to position the weight on the wheel. The body has a front wall facing outwardly from the wheel and at least one cutout area is provided on the front wall for receiving an additional weight. The additional weight is held in the cutout area by the walls. The additional weight can be adhesively secured to the first weight.

4 Claims, 8 Drawing Figures

SUPERPOSITIONED VEHICLE WHEEL BALANCE WEIGHTS AND METHOD

BACKGROUND OF THE INVENTION

1. Field of the Invention

This invention relates to the field of balancing vehicle wheels and more particularly to a wheel balance weight and method for facilitating the balancing of vehicle wheels when using an electronic balancer that indicates the proper weight to be applied and the location on the wheel to properly counterbalance the wheel.

2. Description of the Prior Art

The use of weights to counterbalance vehicle wheels is well known for decades. The majority of vehicles wheel weights are applied to the rim flange by means of a steel clip gripping the protruding lip of the rim flange at one end and embedded into a mass of heavy metal at the outer end.

Another means of securing balance weights to vehicle wheels is through the use of adhesive back weights such as have been disclosed in U.S. Pat. Nos. 3,177,039 and 3,273,971. The typical adhesive back weight was designed simply to be adherent to a radially inner surface of the wheel and not to be positioned on the rim flange adjacent the protruding lip. Such location requirements are not easily met with the variety of wheels having radial surfaces at differing locations from the rotational axis of the wheel. With weights either of the clip-on type or adhesive-back type, the weights must be applied in the proper weight size at the proper location on the wheel or otherwise the out-of-balance condition is not corrected. The problem of positioning the weight at the proper location is particularly acute utilizing conventional electronic balancers of the prior art and attempting to position the adhesive back weight. The clip-on weight can be secured to the rim flange and protruding lip, but the adhesive back weight of the prior art required the weight to be located on the radially inner surface of the wheel.

For adhesive back weights, the conventional electronic balancers do not take into consideration that the adhesive weights must be applied at the radially inner surface and, therefore, it has been found in practice that the application of the adhesive back weight to the wheel is likely to produce large errors and fail to correct the out-of-balance condition of the vehicle wheel. Further spins of the electronic balancer will be required until the out-of-balance condition has been corrected.

In the application of clip-on weights, it is found, though not as frequently as with adhesive back weights, that operator error or balancer indicator error causes a mispositioning of the balance weight resulting in a continuation of an out-of-balance condition.

The operator then would be faced with the prospect of removing the weight which is a difficult task at best, particularly with the highly adherent adhesives used in the industry today that prevent removal without distruction of the weight. The removal of a mispositioned clip-on weight also results in the loss of that weight because the clip-on weights should not be reused after having been once applied.

When there is a misapplication of the balance weight by reason of a deviation from the correct location for the weight to be applied to the vehicle wheel, there is an inherent deduction in the effective moment at the light spot, and that the only possibility of achieving a proper balance is to add further weight to the wheel. In the past, such additional weights had to be applied adjacent to the misapplied balance weight in an abutting relationship, because there was no possibility for superposing such weights. It should be apparent that any such additional weights in abutting relationship further detract from the appearance of the wheel, particularly when they are applied to the expensive custom wheels used in many automobiles today.

OBJECTS OF THE INVENTION

It is the principal object of the present invention to provide wheel balance weights in combination that facilitate the correction of an out-of-balance condition of vehicle wheels.

It is a further object of the present invention to provide additional balance weights that can be superposed onto the first wheel balance weight to correct more precisely the out-of-balance condition that may have arisen through operator or balancer error.

It is a further object of the present invention to provide a balance weight having a cutout area into which an additional balance weight may be positioned and held securely in place in order to meet and correct small out-of-balance conditions in a vehicle wheel assembly.

This invention has as a further and a more particular object the provision of the weight and method whereby out-of-balance conditions may be corrected by the addition of a small balance weight directly to and on top of the first weight rather than requiring the removal of the balance weight.

It is also an object of the present invention to provide a wheel balance weight and method for counterbalancing wheels which minimizes the number of weights required to counterbalance properly the wheel and eliminate the waste attendant to balancing operations due to operate error or balancer error.

SUMMARY OF THE INVENTION

The balance weight of the present invention is used to counterbalance vehicle wheels and is provided with a body of a heavy metal mass and a front wall to face outwardly from the wheel. The front wall has areas for receiving at least one additional weight and the area may be cut out to aid in receiving and retaining the additional weight to more precisely balance the wheel. The additional weight may be adhesively secured to the front wall in the cutout area or the additional weight may be applied with mechanical force to secure the additional weight to the first weight.

The method for counterbalancing vehicle wheels by determining the weight value and location of the balance weight to be applied from conventional balancers and then selecting the first weight of a weight size as close to the determined weight value as possible. An additional weight may be applied adhesively or mechanically at this time as may be required to meet the determined weight value and to precisely counterbalance the wheel. Any remaining out-of-balance condition is determined by another spin of the wheel on the wheel balancer and the additional weight value noted. An additional balance weight of a weight size about equal to the additional weight value noted, is then selected and added to the first balance weight in order that the total of the weight sizes of each balance weight is approximately equal to the total weight value previously determined in order to counterbalance the wheel. The additional weight may be applied to the first weight before or after the determination of the remaining out-of-balance condition. The additional balance weight is then secured to the top of the front face of the first balance weight.

THE DRAWINGS

DETAILED DESCRIPTION OF THE INVENTION

Figure 1:
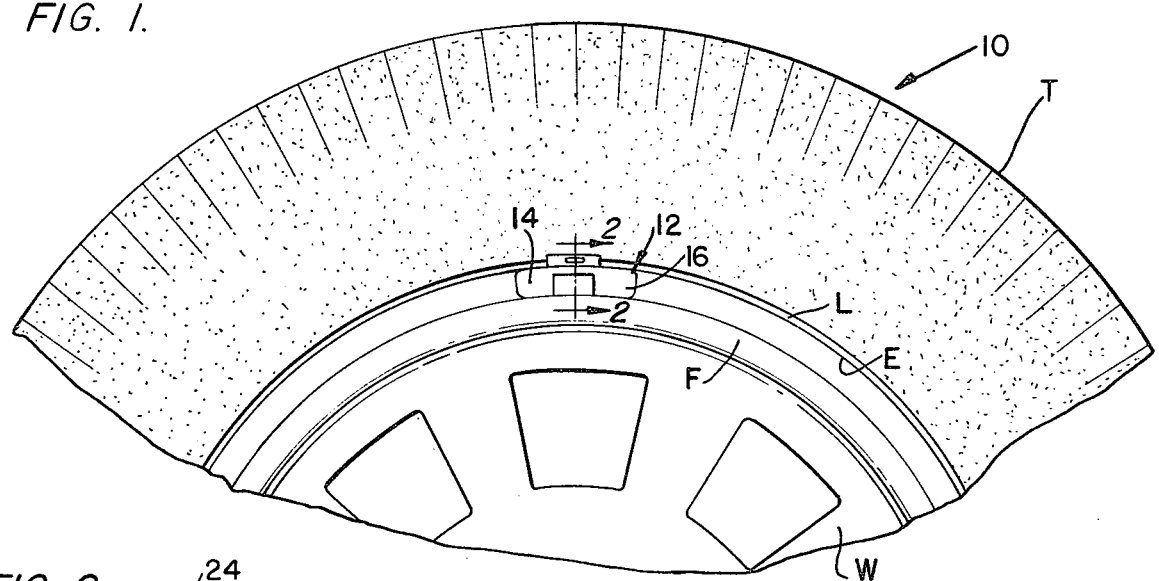
FIG. 1 is a plan view of the wheel assembly of the present invention illustrating a balance weight in position on the rim flange.

FIG. 1 illustrates a vehicle wheel assembly 10 comprising a tire T and a wheel W. The wheel W is provided with a rim flange F and a projecting lip L formed typically with a fillet E at the cross section of the projecting lip L and the rim flange F. The projecting lip L is typically provided with a surface S concentric to the axis of rotation of the wheel assembly and extending at right angles to the surface of the rim flange F.

Figure 4:
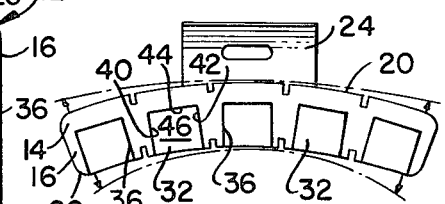
FIG. 4 is a plan view of the vehicle weight of the present invention illustrating a plurality of cutout areas and also including an illustration of the notches to permit bending of the weight to conform to the radius of the wheel.
Figure 5:
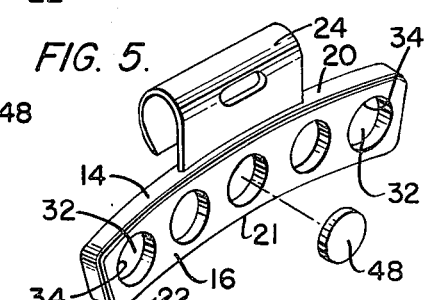
FIG. 5 is an exploded view in perspective of a wheel weight in accordance with the present invention illustrating a plurality of the cutout areas and one of a plurality of additional weights that may be added.
Figure 6:
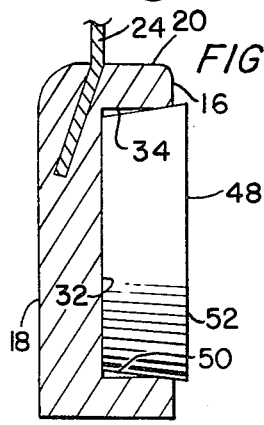
FIG. 6 is a cross-sectional view similar to FIG. 2 but illustrating an alternate embodiment with a conically shaped additional weight forced into the cutout area.
Figure 7:
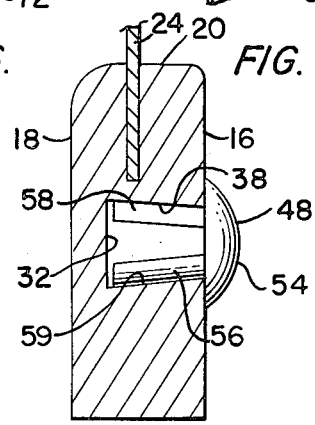
FIG. 7 is a cross-sectional view similar to FIG. 2 but showing an alternate embodiment for securing the additional weight.
Figure 8:
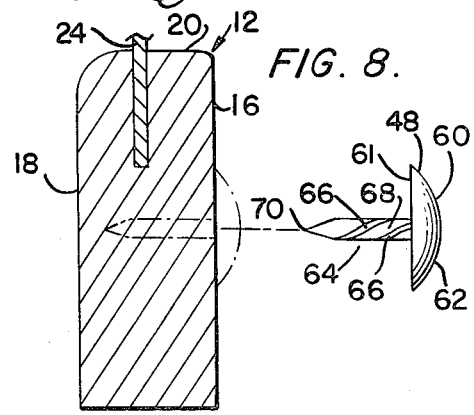
FIG. 8 is an exploded cross-sectional view similar to FIG. 2 showing an alternate embodiment in which the shank of the additional weight penetrates the front face of the weight to be there secured.

The wheel balance weight of the present invention is best shown in FIGS. 2 through 5 while FIGS. 6, 7 and 8 illustrate alternate embodiments of the present invention.

The wheel balance weight is formed of a body 12 and comprises of mass of heavy metal, typically lead or lead alloy, steel or the like, shaped to have an elongated body 14 as best shown in FIGS. 4 and 5. The length of the elongated body 14 is typically greater than the width and the width typically greater than the thickness, although these proportions are not critical. The body is provided with a substantially planar front face 16 and a substantially planar rear surface 18. The top surface 20 of the weight is essentially flat but may be curved slightly so that the top surface 20 is slightly convex. The bottom surface 21 may have a slightly concave surface. The bottom corners of the wheel weight wheel 12 may be rounded as shown at 22, a preferable though not essential design, to prevent the wheel weight from snagging and possibly being ripped off during vehicle operation.

Figure 2:
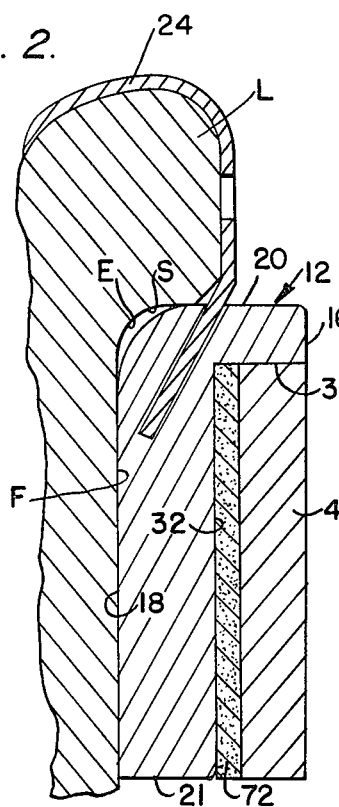
FIG. 2 is an enlarged partly broken away cross-sectional view taken along lines 2—2 of FIG. 1 illustrating the positioning of the balance weight of the present invention held by the conventional clip and including an adhesively secured additional weight held in the cutout area of the first weight.
Figure 3:
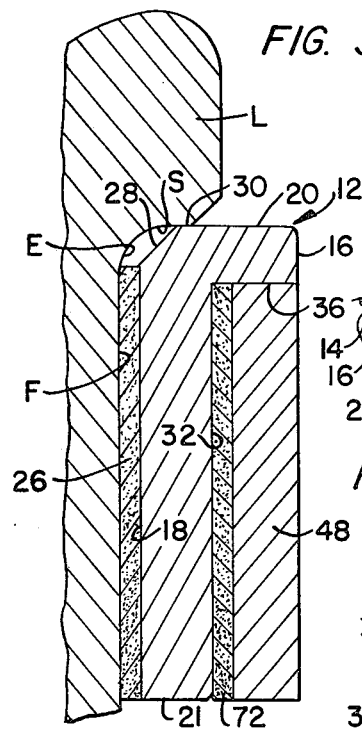
FIG. 3 is also an enlarged partly broken away cross-sectional view taken along lines 2—2 of FIG. 1 illustrating the positioning of the adhesively secured balance weight and the positioning of the additional weight in the cutout area on the front face of the first weight.

The wheel weights of the present invention may be provided with a conventional clip 24 as shown in FIG. 2 or an adhesive layer 26 as shown in FIG. 3. The adhesive layer 26 may have been provided with a peelable strip (not shown) to protect the adhesive layer 26 prior to its installation in the wheel rim.

As described in a related U.S. patent application, filed by one of the present inventors and having common assignee, a chamfer surface 28 is formed as best shown in FIG. 3 by removing a portion of the top surface 20 to form a top abutment surface 30. The chamfer surface is formed by removal at the arris of approximately 0.05–0.3 inches of each surface preferably removing 0.05–0.09 inches, and more preferably approximately 0.07 inches. The angle formed by the chamfer surface 28 with the rear surface 18 is most preferably about 40° but may be extended to an angle between 40° and 50° and, more broadly, it is possible that the angle may be between 30° and 60°.

The extent of the contact of the abutment surface 30 with the lip surface S should be at least 0.05 times the thickness of the weight that is measured from the rear surface 18 to the front surface 16. The top abutment surface 30 is measured from the intersection of the chamfer surface 28 and the top surface 20 and extends for as long as the surface S of the protruding lip L is in contact with the top surface 20. The top abutment surface should be at least 0.02 inches to prevent accidental and unintentional dislodgement of the wheel weight from the flange.

As best shown in the exploded perspective view of FIG. 5, but also with reference to FIGS. 2, 3 and 4, an important feature of the present invention is illustrated by the cutout area 32. The cutout area 32 may be in any shape, such as the cylindrical shape of FIGS. 5 and 6 at 34, the rectangular shape as shown in FIG. 4 at 36 as best shown in FIG. 4 or conical as shown in FIG. 7 at 38.

It is preferable that the cutout area be symmetrically placed along the longitudinal length of the weight as shown in FIGS. 4 and 5, although this is not critical. The cutout area may be off center in a vertical direction as shown in FIG. 4 in order to retain a portion of the front face or surface 16 to form the top wall 20. The walls 40, 42, 44 and 46, as shown in FIG. 4, form a retention means for securely retaining the additional weight 48 which may be optionally added to the first or principal weight 12. The walls of the cutouts of FIGS. 6 and 7 are similarly provided to act as retention means. The additional weight 48 is restrained by the side walls 40, 42 and 44 from transverse movement through these side walls and generally within a plane parallel to the plane of the vehicle wheel and the rear wall 46 acting to prevent axial or transverse movement to the plane parallel to the plane of the wheel.

It should be understood that the shape of the cutout area may not conform to any of those shapes illustrated but may be irregular, if desired, but should in general conform at least in part to the shape of the additional weight 48. The additional weight 48 is also preferably considerably smaller and lighter than the weight size of the weight 12.

It has been found preferable that the additional weight be of a weight size of approximately 0.1 ounce, particularly when the first weight sizes are in the range of typically available sizes of 0.5, 1.0, 1.5, 2.0, 2.5, 3.0 ounce sizes. While the sizes are not critical, it should be apparent that with the additional weight of a magnitude of 0.1 ounces and the first weight 12 of a weight size in the order of 1.5 that, by adding up to four 0.1 ounce additional weights 48, any weight size variation in 0.1 ounce increments is possible to accurately balance the vehicle wheels.

As shown in FIGS. 4 and 5, therefore, the number of cutout areas is preferably, although not necessarily, five in number so that any number of weights from 1 through 4 may be symmetrically positioned.

It follows from the variation permitted in the shape of the cutout areas that the additional weight 48 may be in any form, such as the rectangular prism to fit in the cutout areas 32 of FIG. 4, or may be conically shaped as shown in FIGS. 5 and 6 where the sides 50 are tapered inwardly in the form of a truncated cone in which the outer surface 52 has a greater dimension than the greatest dimension of the cutout area 34. In this embodiment, the additional weight 48 in the form of the truncated cone is forced into the cutout area 34 to be retained in place by the sides 50 acting as the retention means.

In FIG. 7, the additional weight 48 has a head 54 in the form of a bulbous mass having depending therefrom a split shank 56 and 58 embedded at the shanks' trailing ends in the bulbous mass 54. The cutout area 38 in FIG. 7 has the walls 59 tapered inwardly so that, upon depressing the split shanks 56 and 58 for insertion into the cutout area 38, the additional weight 48 is retained in place by the walls 59.

In FIG. 8, a somewhat different embodiment is disclosed in which the additional weight 48 is in any shape, such that the head 60 formed as a bulbous mass, may have a flat base 60 and a flat or a rounded smooth top, as shown in 62, from which depends a rigid shank 64 that may be of steel or the like, embedded at its trailing end in the head 60. The grooves 66 with adjacent ribs 68 may be provided to produce good gripping means and may form a screw thread or be parallel to and extend longitudinally of the length of the shaft. A sharpened or narrowed point or leading end 70 is helpful to obtain the penetration desired. In this embodiment, the front face of the weight 12 does not have cutout areas, although there are areas provided on the front face 16 of the weight 12 so that, upon mechanical force being applied to the surface 62 of the additional weight 48, the sharpened point 70 of the shank 64 will penetrate into the weight as shown in phantom lines in FIG. 8. The rib and groove combination 66 and 68 will aid in gripping the weight 12 and retain the additional weight in position.

Of course, in addition to the means for holding the additional weight 48 in place, one of the simplest and easiest methods would be to utilize an adhesive layer 72 as shown in FIGS. 2 and 3. With such an adhesive layer, the additional weight 48, particularly when applied to the cutout areas 36 as shown in FIG. 4, would be adequate to retain the additional weight in position. The adhesive layer in contact with the rear wall surface 46 also prevents movement transverse to the plane of the vehicle wheel.

In the operation of the present invention and the use of the weights with the conventional electronic balancer, there is provided a readout on the balancer of the magnitude of the weight to be applied on both the inner and outer wheel rims and the angular location of the weight. Experience has demonstrated that the operators may not be very adept at placing the weight in the correct location whether the weight to be applied has a conventional clip or an adhesive backing.

The weight 12 is selected on the basis of the electronic balancer readout to have a weight size as close as possible to the weight value indicated on the electronic balancer. If a 2.1 ounce weight value is indicated, a 2.0 ounce weight size balance weight 12 is selected along with an additional weight 48 that preferably has a weight size of 0.1 ounces. The additional weight 48 may then be applied either by means of the adhesive or any one of the other means as shown in FIGS. 5 through 8 and is preferably applied in the center of the weight 12. If the positioning of the first weight 12 and the additional weight 48 is accurate and the electronic balancer accurately indicated the amount of the out-of-balance, then the wheel to which the two superposed weight combination is applied should be in correct balance.

A respin of the wheel on the electronic balancer will indicate whether there is any remaining out of balance on the wheel. Experience has shown that wheel balance operators often misplace the weight and thus the effective moment of the weight is reduced at the light spot of the wheel. Rather than attempting to remove the weight 12 and discard it in accordance with the present invention, it is possible to note the out-of-balance condition, say, 0.2 ounces and apply two additional 0.1 ounce weights 48 alongside of the previously positioned additional weight after the first superposed weight combination had been in position on the wheel. The total weight sizes applied is 2.1 ounce plus 0.2 ounce and is equal to the total of the weight value indicated previously. With such additional weights being added to correct the mispositioning of the original weights, the wheel is probably, to all practical purposes, in correct balance. A respin of the wheel will verify this. If a remaining out-of-balance still exists, further weight may be added as necessary.

It should be understood from the foregoing that the additional weight 48 may be applied to the first weight 12 either before or after the determination of any remaining out-of-balance condition. The additional weight, therefore, may be applied to the weight 12 prior to the superposed weight combination being added to the wheel or the additional weight may only be added to correct any remaining out-of-balance condition. In either case, the total of the weight sizes applied to the wheel is equal to the total of the weight value previously determined in one spin of the electronic balancer or the total of the weight values of each spin of the balancer should there have been some error in the application of the initial weight or weights to the wheel after the first determination of the weight value necessary to counterbalance the wheel.

With the foregoing description, it is believed that the objects of the present invention have been met and that the scope of the invention should be limited solely by the appended claims.

We claim:

1. A balance weight for counterbalancing vehicle wheels having a rim flange with a protruding lip comprising, a mass of a heavy metal having a body forming, a first balance weight for positioning on said flange, a wheel securing means positioned on said weight for securing the weight to the wheel, said body having a front face directed outwardly from the wheel when the weight is affixed to the wheel, said front face having a plurality of cutout areas for receiving at least one additional weight, said cutout means including side wall and rear wall surfaces, said side wall surfaces forming a retention means for said additional weight, said retention means for restraining said additional weight from movement transverse to said side walls within the plane parallel to the plane of said vehicle wheel, at least one additional mass of heavy metal forming a balance weight positioned within at least one of said cutout areas, said additional weight including an adhesive layer to secure said additional weight to said rear wall surface of said cutout area to restrain said additional weight from movement transverse to the plane of said vehicle wheel, whereby more than one additional weight may be affixed to said first balance weight without removing said first balance weight from said vehicle wheel.

2. The structure of claim 1 including more than one additional weight being positioned in said cutout areas.

3. The structure of claim 2 including said additional weights when positioned within each one of said cutouts not protruding beyond the outermost surface of said first balance weight.

4. The weight of claim 1, 2 or 3 including, said cutout areas being symmetrically located between opposite ends of the weight.

* * * * *